United States Patent [19]

Dworkin

[11] Patent Number: 4,992,940
[45] Date of Patent: Feb. 12, 1991

[54] SYSTEM AND METHOD FOR AUTOMATED SELECTION OF EQUIPMENT FOR PURCHASE THROUGH INPUT OF USER DESIRED SPECIFICATIONS

[75] Inventor: Ross E. Dworkin, Parkside, Pa.
[73] Assignee: H-Renee, Incorporated, Wallingford, Pa.
[21] Appl. No.: 322,105
[22] Filed: Mar. 13, 1989
[51] Int. Cl.$^5$ .............................................. G06F 15/21
[52] U.S. Cl. ................................... 364/401; 364/408; 235/383
[58] Field of Search ....................... 364/401, 406, 408; 235/383

[56] References Cited

U.S. PATENT DOCUMENTS

| | | | |
|---|---|---|---|
| 3,757,037 | 9/1973 | Bialek | 364/900 |
| 4,645,873 | 2/1987 | Chomet | 379/95 |
| 4,775,935 | 10/1988 | Yourick | 364/401 |
| 4,799,156 | 1/1989 | Shavit et al. | 364/401 |

OTHER PUBLICATIONS

"Toucheon Interactive Videodisc Catalog Markets Furniture at Dayton's"; News and Notes-Videodisc, vol. 5, No. 5 Oct. 1985.

*Primary Examiner*—Michael R. Fleming
*Assistant Examiner*—Gail O. Hayes
*Attorney, Agent, or Firm*—William H. Eilberg

[57] ABSTRACT

An automated system assists a user in locating and purchasing goods or services sold by a plurality of vendors. The system includes a programmed computer which is linked to a database. The database contains information about a large number of different products and/or services, arranged in various categories. For each product or service, the database contains information on price, vendor, specifications and/or availability. In operating the system, the user first indicates the general type of product or service desired. The system responds by displaying a template giving specifications for the type of product or service selected. The user then fills in one or more blank spaces in the template, to tell the system the minimum desired specifications for the product or service. The computer then searches the database to retrieve all products or services, within the product or service category selected, having the specifications required by the user. The system display such products or services to the user, who can request more detailed information about a particular product or service, or information on vendors and prices. The user can then select one or more items for immediate purchase, and the system automatically transmits the order to the appropriate vendor.

12 Claims, 9 Drawing Sheets

MAIN MENU

1. HARDWARE PRODUCTS
2. SOFTWARE PRODUCTS
3. SOFTWARE CONSULTANTS
4. INFORMATION ON NEW PRODUCTS
5. CANCEL AN ORDER
6. RETURN MERCHANDISE AUTHORIZATION
7. VENDOR INFORMATION
8. COMMUNICATE WITH MANAGEMENT
9. EXIT FROM SYSTEM

FIG. 3

HARDWARE PRODUCT MENU

| | SYSTEMS | | PRINTED CIRCUIT BOARDS |
|---|---|---|---|
| 1. | MICROCOMPUTERS | 10. | MONITOR CARDS |
| 2. | PORTABLE COMPUTERS | 11. | MULTI I/O CARDS |
| | | 12. | EXTENDED MEMORY BOARDS |
| | MASS STORAGE DEVICES | 13. | DISK DRIVE CONTROLLERS |
| 3. | HARD DISK DRIVES | 14. | NETWORK BOARDS |
| 4. | FLOPPY DISK DRIVES | 15. | MULTI-USER BOARDS |
| 5. | TAPE DRIVES | | |
| | | | INPUT DEVICES |
| | DISPLAY DEVICES | 16. | KEYBOARDS |
| 6. | MONITORS | 17. | MOUSE INPUT DEVICES |
| 7. | TERMINALS | 18. | DIGITIZERS |
| | | 19. | SCANNERS |
| | OUTPUT DEVICES | | |
| | | | COMMUNICATION DEVICES |
| 8. | PRINTERS | 20. | MODEMS |
| 9. | PLOTTERS | 21. | FAX CARDS |
| | | 22. | EXIT |

FIG. 4

TECHNICAL CRITERIA — PRINTERS

PRINTER TYPE ( 1. LASER   2. DOT MATRIX   3. DAISY WHEEL   4. THERMAL )

PRINTER SPEED (CPS)   (LETTER QUALITY):
                      (NEAR LETTER QUALITY):
                      (NON-LETTER QUALITY):

MINIMUM BUFFERED MEMORY (KB):

INTERFACE TYPE:   SERIAL:
                  PARALLEL:
                  SERIAL AND PARALLEL:

CARRIAGE WIDTH:   WIDE:
                  REGULAR:
                  LARGER THAN WIDE:
                  LABEL:

TRACTOR FEED CAPABILITY REQUIRED (Y/N):

CHARACTER ENHANCEMENT CAPABILITY (E.G. BOLD, UNDERLINE, ETC.) (Y/N):

IF DOT MATRIX, PIN DENSITY (PINS PER INCH):   VERTICAL:
                                              HORIZONTAL:

FIG. 5

PRODUCT INFORMATION SCREEN

| NO. | MANUFACTURER | MODEL | LOW PRICE | AVG. PRICE | LIST PRICE |
|---|---|---|---|---|---|
| 1 | ACME PRINTER CO. (ONE-YEAR WARRANTY; TWENTY-FOUR HOUR SUPPORT) | 1600 | $399 | $550 | $600 |
| 2 | ACME PRINTER CO. (ONE-YEAR WARRANTY; TWENTY-FOUR HOUR SUPPORT) | 1800 | $500 | $600 | $800 |
| 3 | BEST PRINTERS, INC. (COMES WITH SUPPLY OF RIBBONS) | F-28 | $425 | $575 | $650 |
| 4 | SUPER PRINTER CO. (COMPLETE WORD-PROCESSING FUNCTIONS) | 3800 | $995 | $1200 | $1400 |
| 5 | SUPER PRINTER CO. (TWO-YEAR WARRANTY; COMPATIBLE WITH DIABLO 630) | 4000 | $1050 | $1300 | $1695 |

1) INVESTIGATE PRODUCT
2) DISPLAY NEXT PAGE
3) EXIT

FIG. 6

SUPPLIER INFORMATION FOR ACME PRINTER CO. 1800

|  | QUANTITY | | |
|---|---|---|---|
|  | 1 | 2-4 | 5+ |
| SUPPLIER: ADVANCED COMPUTERS, INC.   PRICE: | $575 | $550 | $525 |

SUPPLIER NO.: 145
STATE: CA
MINIMUM ORDER: $100
TERMS ACCEPTED: MC/V/AX/DC/COD
COMMENTS OF SUPPLIER: SERVICE CONTRACT AVAILABLE

SUPPLIER INFORMATION FOR ACME PRINTER CO. 1800

|  | QUANTITY | | |
|---|---|---|---|
|  | 1 | 2-4 | 5+ |
| SUPPLIER: COMPUTER DISCOUNT CO.   PRICE: | $500 | $500 | $500 |

SUPPLIER NO.: 286
STATE: PA
MINIMUM ORDER: $25
TERMS ACCEPTED: MC/V/AX/COD
COMMENTS OF SUPPLIER: WE WILL BEAT ANY PRICE!

SUPPLIER INFORMATION FOR ACME PRINTER CO. 1800

|  | QUANTITY | | |
|---|---|---|---|
|  | 1 | 2-4 | 5+ |
| SUPPLIER: HARDWARE UNLIMITED   PRICE: | $600 | $575 | $550 |

SUPPLIER NO.: 350
STATE: IL
MINIMUM ORDER: NONE
TERMS ACCEPTED: ALL MAJOR CARDS; COD
COMMENTS OF SUPPLIER: ORDERS FILLED IMMEDIATELY FROM
                     LARGE INVENTORY.

1) ORDER A PRODUCT
2) CONTINUE
3) EXIT

*FIG. 7*

PRODUCT SPECIFICATIONS

MANUFACTURER: ACME PRINTER CO.

MODEL NO.: 1800

PRINTER TYPE: DOT MATRIX

PRINTER SPEED: 150 CPS (DRAFT MODE)/50 CPS (NEAR LETTER-QUALITY MODE)

INTERNAL BUFFER SIZE: 2 KB

INTERFACE TYPE: PARALLEL/SERIAL

CARRIAGE WIDTH: REGULAR

TRACTOR FEED: YES

CHARACTER ENHANCEMENTS: YES

PIN DENSITY (PINS PER INCH): 180

COMMENTS: ONE-YEAR WARRANTY; TWENTY-FOUR HOUR SUPPORT

FIG. 8

SYSTEM AND METHOD FOR AUTOMATED SELECTION OF EQUIPMENT FOR PURCHASE THROUGH INPUT OF USER DESIRED SPECIFICATIONS

BACKGROUND OF THE INVENTION

This invention is an automated system and method for locating and purchasing products or services having desired characteristics. The invention is particularly useful in purchasing computer equipment and computer services, but is not limited to use in any one field.

Locating and purchasing equipment, especially technical products such as computer equipment, can be tedious and time-consuming. Each type of product may be available from several different manufacturers, and each manufacturer may sell its products through a large number of distributors. The prices of the products, in general, vary considerably from one manufacturer to another, even after taking into consideration the variations in the specifications of products of different makers. More importantly, the same product may be sold at widely disparate prices by different distributors. Thus, a user who wants to find a desired product, having a set of minimum specifications, at the lowest price, must consult the catalogs of a myriad of vendors, and may also need to spend considerable time on the telephone or in personal visits to stores. The difficulty of this process makes it unlikely that the average purchaser, or even the more sophisticated purchaser, will truly obtain the best price.

The process of purchasing products of various kinds has been eased somewhat by the introduction of computerized shopping systems. For example, the CompuServe Consumer Information Service provides a computerized shopping service known as the "Electronic Mall". The latter service allows a user to select a category of merchandise, and to place an order for certain items, listed on the system, within that category. The computerized shopping services of the prior art make it convenient to order products, because the ordering can be done without a personal visit, a telephone call, or a written communication. But such electronic shopping services of the prior art have been limited to filling orders for products known in advance to the user. They do not provide much help to the user who is not sure about the products available, and their specifications, but who wants to search for products having the lowest price and which fulfill certain requirements. Thus, the systems of the prior art are essentially equivalent to the old method of consulting individual catalogs or visiting individual stores.

The present invention provides an automated system, which not only permits a user to order products or services directly by computer, but also allows the user to determine the best price available for a product or service meeting a set of specifications. Thus, the present invention provides a system which eliminates the need for the user to consult hundreds or thousands of suppliers.

SUMMARY OF THE INVENTION

The present invention helps a user to locate and purchase goods or services having desired characteristics, and also having the best available price. The invention employs a computer, or equivalent, which is linked to a database containing information about products and services and the vendors who supply them. The database may be located in the memory of the central computer, but could also be located elsewhere. In the preferred embodiment, there is a central computer which serves many users. The central computer may be located far away from all such users.

In practicing the invention, the user must first tell the system the general type of product or service desired. This step can be done by selecting an appropriate item from a menu. In response to the user's choice, the system displays a template which gives various technical criteria for the product or service. By filling in one or more spaces on this template, the user can tell the system the criteria to be deemed minimum requirements. The system then searches the database for all products or services, within the selected category, which fulfill these minimum requirements. Then the system displays, to the user, general information about the products or services retrieved.

Initially, the system shows the user certain basic information such as the manufacturer, model number, and range of available prices. This initial display also associates each product or service with an internal number, or other designator, which the user can employ to obtain further information.

When the user enters the number or identifier of a product or service appearing on the above-described display, the system shows the user the names of the suppliers from whom that product or service can be obtained. The system also shows the user the prices available from each supplier. At the user's request, the system can also display a set of more detailed specifications for the chosen product or service.

The user can then order a product through the system by selecting one of the retrieved products by its identifier. The system prompts the user for the information necessary to complete the transaction. The system then generates the appropriate documents for recording the transaction, and, if necessary, forwards the documents to the selected supplier. The order can also be transmitted to the supplier electronically.

Other features of the system allow the user to receive announcements about new products or services, to communicate complaints or suggestions to management or to a particular supplier, or to receive help in using the system. The user can also obtain detailed information about the requirements and policies of a particular vendor.

The present system and method therefore enable the user to shop for products or services having particular specifications, and having the lowest price. The user does not need to consult the individual catalogs of suppliers, and can do all the shopping from a computer or terminal located virtually anywhere. The user can quickly and easily find the product or service having the lowest price, and having the required specifications.

It is therefore an object of the invention to simplify and automate the process of locating and purchasing products or services having desired characteristics.

It is another object to provide a system and method for selecting and/or purchasing products and/or services.

It is another object to provide a system which replaces a plurality of catalogs, and which greatly reduces the time required in shopping for products or services.

It is another object to provide a system and method as described above, wherein a user can easily shop for equipment, having specified characteristics, from a plurality of vendors, and wherein the user can easily determine which vendor offers the best price.

It is another object to provide a system and method as described above, wherein a user can easily obtain detailed specifications about any product offered for sale.

It is another object to provide a system and method as described above, wherein the user can easily obtain information about a particular vendor.

It is another object to provide a system and method which facilitates the processing of orders for goods or services transmitted by a user.

It is another object to provide a system and method which allows suppliers to notify large groups of potential buyers about new products or special promotions.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 3 shows a sample of a main menu which is displayed by the system, according to the present invention.

FIG. 4 is a sample of a menu of products, showing, in this example, a set of possible computer hardware products from which the user may choose.

FIG. 5 is a sample of a display, generated by the system of the present invention, showing a template of product specifications to be entered by the user.

FIG. 6 is a sample display, generated by the system, showing general information on products which fulfill the specifications entered by the user.

FIG. 7 is a sample display, generated by the system, showing information about the suppliers of a product in which the user is interested.

FIG. 8 is a sample display, generated by the system, showing detailed specifications for a particular product.

DETAILED DESCRIPTION OF THE INVENTION

The present invention is a system and method which enables a user to locate products or services, sold by a variety of vendors or suppliers, and having a desired set of specifications. The system thereby enables the user to "shop" for products meeting the user's own minimum requirements, and having the best price, without the need to consult individual catalogs or visit stores. The examples given below deal with computer equipment, but it is understood that the invention can be used to buy products or services in virtually any other field. The terms "vendor" and "supplier" are used herein interchangeably.

Figure 1:
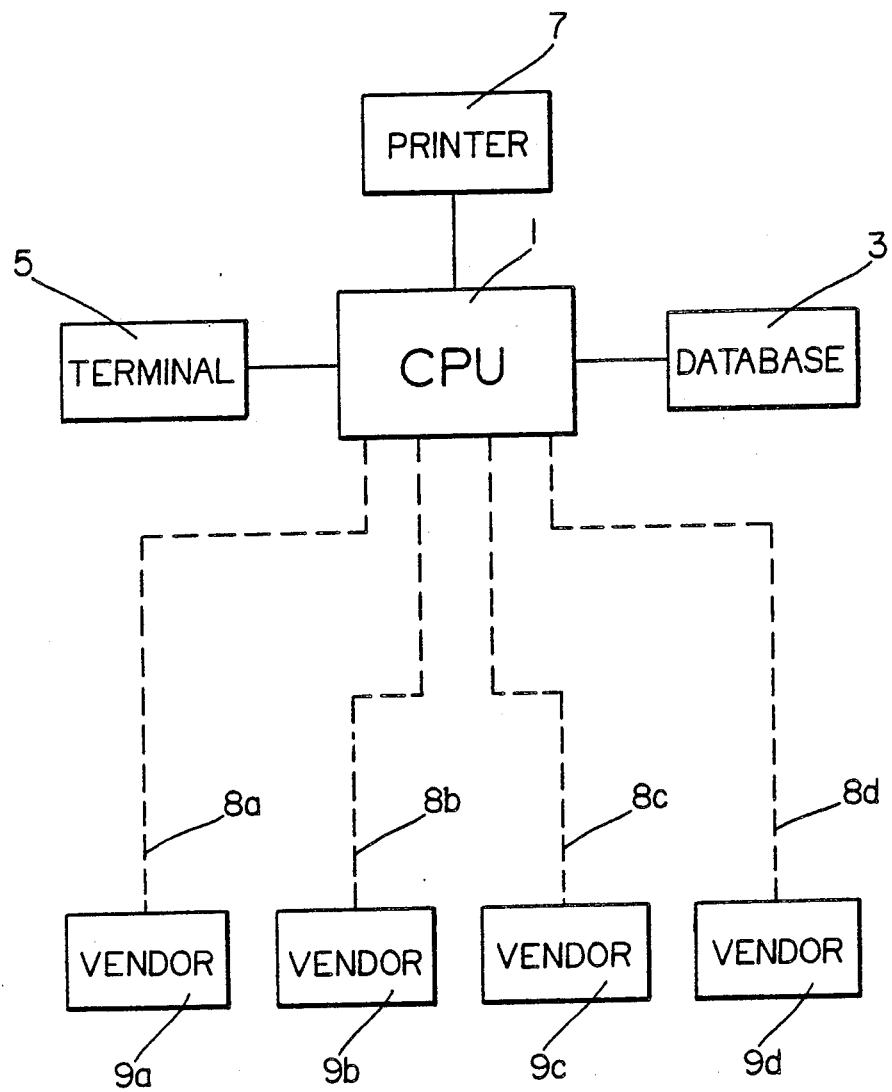
FIG. 1 is a block diagram showing the general arrangement of the components of the system of the present invention.

FIG. 1 shows the basic arrangement of a system of the present invention. The core of the system is central computer (or "CPU") 1. The computer is connected to database 3. The database can be stored in the memory of computer 1, or it can be stored at some remote location. The database contains information about products and/or services, and the vendors who sell them. In the preferred embodiment, the database may be the equivalent of thousands of catalogs of individual suppliers. The type of information stored in the database will be illustrated below.

Computer 1 also communicates with terminal 5. The terminal can be at the same location as the computer, or it can be located remotely. In the latter case, the terminal is connected to the computer by telephone lines and modems, or their equivalents, in a conventional manner. In the preferred embodiment, there are many terminals, operated by many users, all connected to central computer 1. The central computer is programmed, using known techniques, to accommodate a large number of users.

Computer 1 is connected to an output device, such as printer 7. The printer is used to create permanent records of transactions, and to generate the necessary documents to be sent to the vendor of the equipment selected for purchase by the user. The set of vendors is schematically represented by blocks 9a, 9b, 9c, and 9d. The computer can also be connected electronically to the vendors, as indicated by dotted lines 8a, 8b, 8c, and 8d. Thus, orders to suppliers can be placed by ordinary mail, by electronic mail, or both. Orders can also be placed by facsimile. Note that it is the system, not the customer, which contacts the supplier to place an order.

In general, there can be any number of suppliers. It is preferred that the number of suppliers be as large as possible, so as to maximize the probability that the user will find the desired product at the lowest possible price.

Figure 2A:
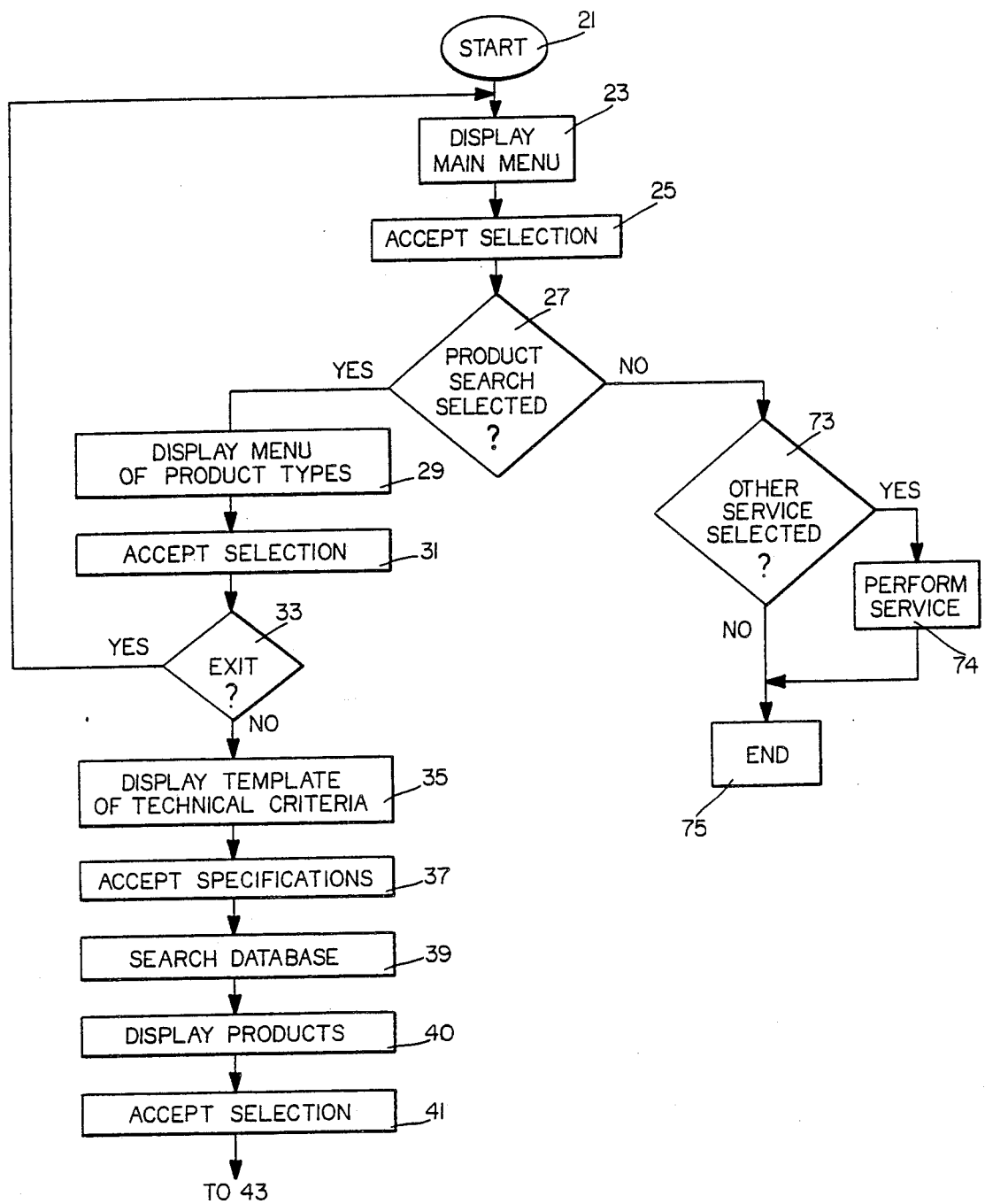
FIGS. 2a and 2b together constitute a flow chart showing the programming of the computer used in practicing the present invention.
Figure 2B:
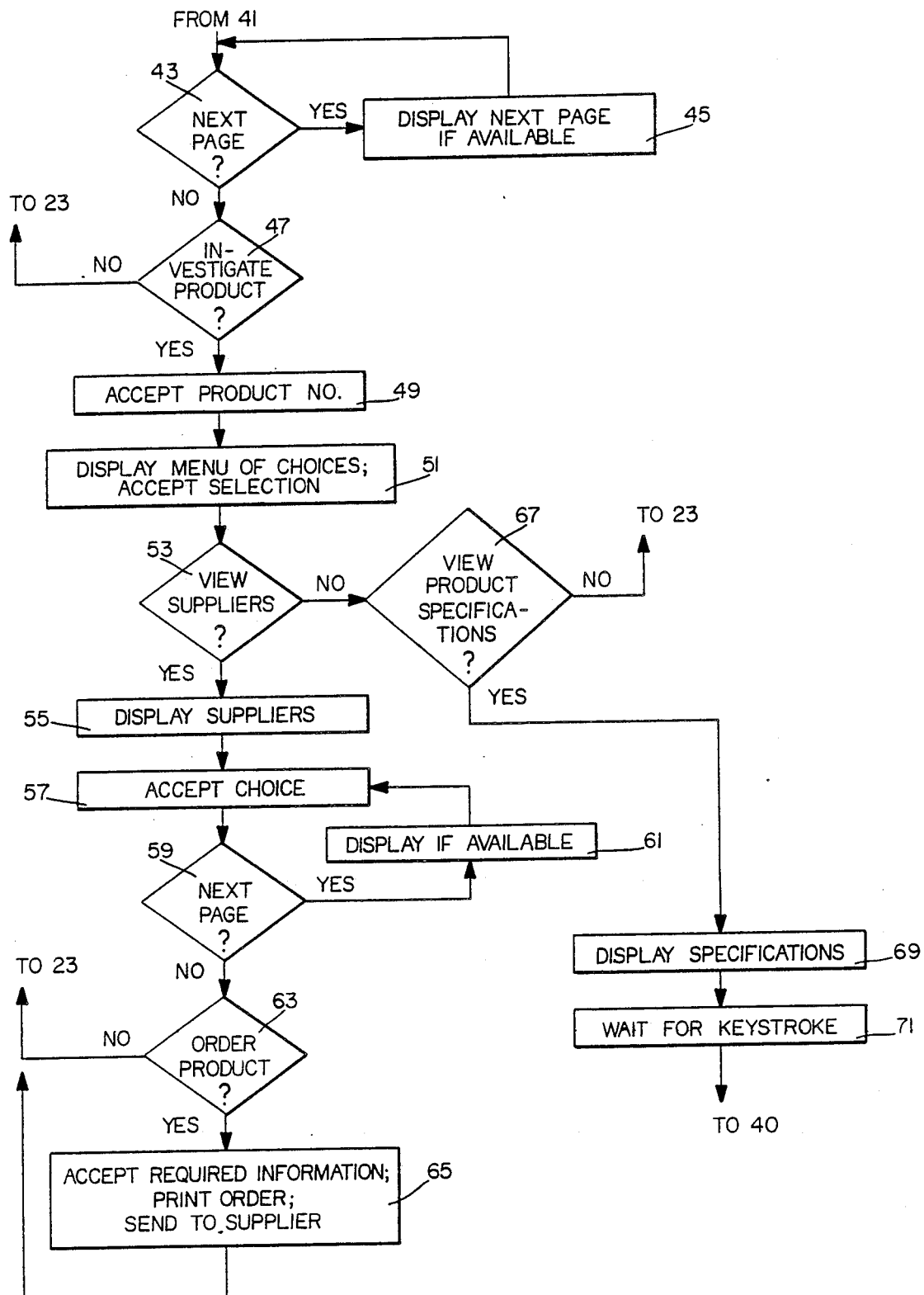

FIG. 2 is a flow chart illustrating a possible means of programming of computer 1, and thus illustrating the essential features of the method of the present invention. The operation of the program will be described with respect to the flow chart.

The system begins in block 21. Block 21 can be executed after the system verifies that the user is authorized, such as by checking an identification number and password. The use of identification numbers and password are optional, however. In block 23, the system displays, to the user, a "Main Menu", which lists the major selections available. In the discussion that follows, it is assumed that the user is shopping for products or services relating to the field of computers. FIG. 3 shows a sample Main Menu.

As shown in FIG. 3, the user has the choice of searching for 1) hardware products, 2) software products, or 3) software consultants. These first three choices invoke the main function of the system, that is, to search the database for information on particular products or services. The remaining choices enable the user to perform auxiliary functions. The latter functions can include 4) obtaining information on new products, 5) cancelling an order, 6) returning merchandise, 7) obtaining information about a particular vendor, 8) communicating with management, or 9) leaving the system entirely. Choice No. 8 can be used to allow users to make complaints about a particular vendor, or to offer suggestions for improvements. Choice No. 7 yields more detailed information about a vendor than is obtained during a search for a product or service, as will be explained more fully below.

The choices shown in FIG. 3 are only examples; other choices could be added, and any of the choices shown could be omitted, within the scope of the invention. Also, the structure of the Main Menu can be altered in other ways. For example, this menu could be divided into two or more segments. The initial segment would list only the most general categories; the selections could be as broad as "goods" or "services". Then, after the user makes a selection, the next menu segment would contain a set of further choices, these further choices being related to what the user previously selected. The latter modification is also considered within the scope of the invention. Thus, when it is stated that the user selects an item from the Main Menu, it is assumed that such selection could be performed in one or more steps.

In block 25, the system accepts the user's selection from the Main Menu. In test 27, the system determines whether the selection is one which requires a search for a product or service, i.e., in the example of FIG. 3, whether the selected item is No. 1, No. 2, or No. 3. If so, the system continues in block 29.

In block 29, the system displays a menu of product or service types. Continuing with the example of FIG. 3, wherein the field is computers, suppose the user has selected No. 1, i.e. hardware products. Then the system, in block 29, will display a menu of hardware products. Such a menu is exemplified by FIG. 4. FIG. 4 contains a variety of computer hardware products, arranged by category. It is assumed that each type of product listed on this menu is available from at least one vendor on the database. Of course, it is preferable that each product, and each model within a product type, be obtainable from more than one supplier.

The sample display of FIG. 4 is only exemplary, and many other arrangements could be used. The categories of goods or services are somewhat arbitrary and can be modified. If the number of types of products is too large to fit on one screen, the system can be programmed to accept a command to display additional screens of information.

The system accepts a selection from the user, in block 31. The selection can be made by transmitting the number associated with the desired item. Other means of indicating a selection can also be used. In test 33, the system determines whether the user has chosen the "exit" command. If so, the system returns to block 23, and displays the Main Menu again. If not, the system continues in block 35.

In block 35, the system displays a template of technical criteria pertaining to the product selected in block 31. These criteria are used by the system to limit the search for products. As used herein, the term "template" means a screen display which is analogous to a questionnaire. That is, the template lists certain general features of the product selected, and provides areas in which the user can fill in desired specifications.

Suppose, for example, that the user has selected "printers" (No. 8) from the Hardware Product Menu. Then the system might respond by displaying the template shown in FIG. 5.

The template represented in FIG. 5 contains a typical set of specifications associated with printers. The system is programmed, using known techniques, to accept inputs, from the user, for any or all of these specifications. In some cases, the system may accept a number entered on a keyboard, when the cursor is at the end of a given line. In other cases, such as for indicating printer speed, it is necessary to enter a number. However, it is also possible to make the entire screen a "multiple choice" screen, by providing predetermined possible values for each entry and asking the user for a choice. There are many ways of enabling the user to provide the indicated data, and all such ways are considered within the scope of the invention.

Note that the user need not respond to every item in FIG. 5. Some items apply to only certain types of products. Also, the user may not care about one or more of the technical criteria. The system will work with exactly what the user specifies. In the case of a numerical value, such as printer speed, the system assumes that the user has specified a minimum requirement. Thus, if the user indicates that the printer must have a letter-quality speed of 40 cps, the system will search for printers which have a letter-quality speed of 40 cps or faster.

The system accepts inputs of the user's desired specifications in block 37. When the user has entered these specifications, the system searches its database, in block 39, for products fulfilling the indicated criteria. Then, in block 40, the system displays the results.

FIG. 6 shows one possible format by which the system displays the results of the search. FIG. 6 lists a set of hypothetical printers, made by hypothetical manufacturers. These printers are assumed to have been found in the database, and it is also assumed that all have the features specified by the user in block 37. FIG. 6 shows only one screen of entries, but if more entries are found than will fit on one screen, the user can be prompted to view additional items on subsequent screens.

For each product, the entries in FIG. 6 include a number which identifies the product, the name of the manufacturer, the manufacturer's model number for the product, the lowest price available among all the vendors in the database, the average price for the product for all the vendors in the database, and the list price for the product. The entries for lowest price and the average price can be calculated anew for each search, by searching the database for each vendor selling a particular item, and noting the price offered by each vendor. Alternatively, these values can be stored in the database, and displayed without recalculating.

Following each entry, in FIG. 6, is a line giving additional information about the product. This line is optional. It can be included to tell the user about noteworthy features of the product. The user can retrieve more detailed information, for each product, as will be explained later.

The user is then given three choices. First, the user can learn the suppliers of a particular product. Secondly, the user can view detailed specifications concerning a product. Thirdly, the user can leave this part of the program. These choices can be indicated at the bottom of the screen, as shown in FIG. 6. The system accepts a selection from the user in block 41.

In test 43, the system determines whether the user has chosen to view the next page of data. If so, the system displays the next page, if one is available, in block 45. If more data are not available, the system will so indicate, and will return to block 40 to await another selection. For the sake of simplicity, the latter alternative is not shown in FIG. 2.

If the user has not chosen to view another page, the system next determines, in test 47, whether the user wants to investigate a product retrieved in the search. If not, then the user's choice must have been to exit from this part of the program, and the system returns to block 23. If the user has chosen to investigate a product, the system continues in block 49.

In block 49, the user enters the number of the product to be investigated. This number is the product number shown in the left-hand column in FIG. 6. This number is used by the system to identify the products retrieved from the search. It need not have any relationship to the model number or to any other number supplied by the manufacturer. In the example given, the system simply lists the products retrieved from the search in ascending numerical order. Any other arrangement which uniquely identifies each product could also be used.

After the user has selected a product, the system, in block 51, displays a menu of choices. This menu is not illustrated, but can be made to appear at the bottom of the screen of the display illustrated in FIG. 6 after the user selects a product, or it can appear on a separate screen. The latter menu typically consists of three choices, namely 1) obtain information on suppliers of the selected product, 2) obtain specifications concerning the product, or 3) exit. As indicated in block 51, the system accepts a selection from the user.

In test 53, the system determines whether the user has chosen to view the suppliers of the selected product. Suppose the answer is yes. Then the system, in block 55, displays the suppliers, in a manner exemplified by FIG. 7.

FIG. 7 shows a sample screen which gives information about vendors of one of the hypothetical printers identified in FIG. 6, namely the "Model 1800" printer of the "Acme Printer Co." In this example, it is assumed that the system has been programmed to display information about vendors in this particular format. Many other formats could be used, but it is preferable that a particular embodiment of the system use the same format for all products and vendors. In the example of FIG. 7, the generic descriptors are shown in ordinary type, and the specific data are shown in boldface. The specific data can be differentiated from the generic information in other ways, such as by capitalization, but such differentiation is not absolutely necessary.

In the example given, each screen contains information on three suppliers. For each supplier, the system gives the price of the product, including possible quantity discounts. The prices apply to the product model number shown at the beginning of each record. In this example, all three records apply to the "Model 1800" of the "Acme Printer Co." The system also provides the name of each supplier, an identifying number for the supplier (this number being analogous to the internal identifier for products as described above with respect to FIG. 6), the location of the supplier, information on minimum order requirements and terms, and comments provided by the supplier. These comments must fit within the space allowed by the system, which is typically a single line. The numbers used to identify suppliers can be chosen in any manner, as long as each supplier has a unique identifier.

The supplier information screen (FIG. 7) could also include information on the availability of the product. Such information (not shown in FIG. 7) could include 1) the time required for the product to be shipped, 2) whether the supplier offers overnight or two-day delivery service, for a fee, and 3) whether there are any additional handling charges. Other similar information could be provided on the same screen.

Thus, the types of information shown in the product information screen can be varied considerably. The most important information is usually the identity of the supplier and the price.

At the bottom of each screen, as shown in FIG. 7, the user is given the choice of 1) ordering a product, 2) viewing the next screen of data, if any, or 3) exiting from this part of the program. The user enters a choice, and the system accepts this input, in block 57.

Test 59 determines whether the user wants to view another page of data. If so, and if another page is available, the system displays the data, in block 61, and returns to block 57 to accept another choice. If there are no more pages, the system so indicates, and again returns the user to block 57.

Test 63 then determines whether the user has chosen to order a product. If not, the system returns to block 23. If the user wants to place an order, the system continues in block 65. In block 65, the system prompts the user for various pieces of information. Such information should include the identifying number of the supplier from which the user wants to buy. It should also include the user's name and address, and credit card number, if this is the manner of payment. The amount of information taken from the user at this point can vary, and the system can be programmed, using known techniques, to obtain whatever information is deemed necessary. It is also possible for the system to store certain information about each user, so that the user can bypass the step of entering a name and address each time an order is placed.

When the system has all the information needed to process the order, it prints the required documentation, and prepares to have such documentation sent to the selected supplier. The printing step is done at the location of the central computer 1, and the printed document is ordinarily not sent to the user. However, it is desirable that the system provide the user with a transaction number, for future reference. Instead of sending the order by mail, to the supplier, the system can also transmit the order electronically, such as by a conventional electronic mail arrangement. When the order has been printed and/or transmitted to the supplier, the system returns to block 23.

Block 65 can also include the step of calculating the shipping charges for the product. In the preferred embodiment, the database also includes a detailed table giving shipping charges, as established by a common carrier, for substantially every combination of shipping weights and distances. The system is programmed to calculate the gross shipping weight from a knowledge of the net product weight. The net product weight is preferably part of the detailed specifications of the product. The system adds a predetermined percentage to that weight, to account for the weight of the container, also taking into consideration the number of units which can be packed in one container. The system then determines the shipping charge by consulting its stored table and calculating the amount based on distance and total weight. The system can then display the shipping charge to the user immediately, and can add such charge to the bill. The system can do the same for a C.O.D. charge, if any.

Now suppose that the user wanted to obtain detailed specifications for a product. Then test 53 would yield a negative answer, and the system proceeds to test 67. Test 67 determines whether the user has chosen to view product specifications. If not, the system returns to block 23. If so, the system continues in block 69.

In block 69, the system displays a screen showing detailed specifications concerning the product originally selected in block 49. FIG. 8 shows a sample screen containing such information for the hypothetical Model 1800 printer of the Acme Printer Co. These specifications may include the same kind of information selected from the specification screen of FIG. 5. However, the information on the screen of FIG. 8 need not be identical to that shown in FIG. 5. In general, if there is a difference, FIG. 8 would contain somewhat more detailed information.

FIG. 8 is also arranged in the form of a template, with specific entries shown in boldface. It is assumed that the system has stored different templates for different kinds of products. The template shown in FIG. 8 is clearly applicable only to printers. Unlike the case of the template of FIG. 5, the user does not make any choices and does not supply any information when viewing this screen. Instead, it is the system which "fills in" the information indicated on the template. The user is simply prompted to press any key to continue. The system waits for a keystroke, in block 71, and then returns to block 40, where the user can again select a product to investigate. Thus, if the user, after reading the detailed specifications, wants to order the product, the order can be placed by selecting the product again, from the menu, in blocks 41 and 49, and indicating the appropriate choice in block 57. The system can also be programmed so that the user does not need to return to block 40 after viewing product specifications. The system can query the user on whether the user wants to place an order, and from which vendor. This modification is also within the scope of the invention.

If, in test 27, the system determines that the user has not selected a product search, the system continues with test 73. Test 73 determines whether the user has selected another service from the Main Menu. In the example of FIG. 3, test 73 determines whether the user has selected any of item Nos. 4-8. If not, the program ends, in block 75. If so, the system performs the service, in block 74, and then terminates the program in block 75.

Item No. 4 on the main menu enables the user to view information on new products and special promotions. In effect, the system provides the user with a "bulletin board" of special notices from the management of the system, or from one or more suppliers. This bulletin board may include information of virtually any kind that may be of interest to users of the system. In particular, it may alert the user to new products which have only recently become available. This bulletin board may include one or more pages of information, some or all of which can be viewed at the user's option. The user can be given the choice of leaving this part of the program at any point.

Item No. 5 can be used to cancel an order previously made. Cancellation is possible if the user has been given a transaction number, or identifier, as mentioned above. The system can then transmit a cancellation notice, either by mail or electronically, to the appropriate supplier.

Item No. 6 enables the user to return defective merchandise. Again, the user will need a transaction identifier, and the system will assign a Return Merchandise Authorization number. The system can transmit the information to the supplier, and the supplier can expect to receive the merchandise from the user.

Item No. 7 allows the user to obtain information about any supplier listed on the system. The system can be programmed to prompt the user to identify the supplier either by number (i.e. using the numbers appearing on the display exemplified by FIG. 7), or by name. In the latter case, the system would search its database, and display information about every company whose name contains the word(s) entered by the user. In general, the information displayed for each company will be somewhat more detailed than that shown in FIG. 7. The information shown in FIG. 7 should be more limited, because the aim of the latter display is to show as many suppliers of a particular product as possible. But virtually any amount of information about a supplier can be included in the database, for display to the user upon request.

Item No. 8 enables the user to communicate with the management of the system. This option can be, in effect, an electronic mailbox, wherein the user can note complaints about the system or about a supplier. The user can also offer suggestions for improvement of the data formats, etc. This option could also be used to verify that the system received the user's order, to enable the user to apply for credit from suppliers, or for other purposes.

Note that the options shown in FIG. 3 are only exemplary, and not limiting. One or more of the options can be deleted, and options not present can be added, within the scope of the invention.

In the examples given above, it was assumed that the user decided to locate and purchase a printer, i.e. a piece of hardware. A similar procedure is used for other types of products or services. For example, if the user selects Item No. 2, from the Main Menu, then the system, in block 29, will display a menu of types of software. For example, the user can choose from a list of software applications such as accounting, communications, database management, scientific applications, games, computer languages, operating systems, and others. The specification screen displayed in block 35 would then contain criteria pertaining to software. The program would otherwise operate in the same way as described above. A similar procedure can be used for Item No. 3 of the Main Menu. In the latter case, the user would identify the field in which a consultant is desired, and would enter, in block 37, details such as level of experience and possibly a range of hourly rates. The system would then search its database and list the software consultants fulfilling the user's criteria. In the case of software consultants, there would usually be no "product" to order, but instead the user would be given a telephone number and could call the consultant directly.

Note that the information about products, services, and suppliers must, in general, be updated periodically. The operator of the system can update the database, at regular intervals, based on information received from the suppliers. The system can also be programmed to allow direct access, by suppliers, to the database, so that the suppliers themselves can update their information whenever necessary.

Although the invention has been described with respect to certain specific examples, it is apparent that many variations are possible. The screen formats shown are only a few of the many arrangements that can be used. The amount and type of data shown on the screen displays can be varied considerably. The arrangement of the program steps can also be modified in many ways. Such modifications will be apparent to those skilled in the art, and are intended to be included within the spirit and scope of the following claims.

What is claimed is:

1. Apparatus for assisting a user in locating and purchasing computer equipment, comprising:
   (a) means for displaying, to the user, a menu of types of computer equipment, (b) means for accepting, from the user, a choice of one of said types of computer equipment, (c) means for displaying, to the user, a set of technical specifications relating to the equipment chosen by said user, (d) means for receiving, from the user, a choice of at least one specification relating to the chosen equipment, (e) means for searching for a database to locate all items of equipment belonging to the type of equipment chosen by the user and having the chosen specifications, the set of items retrieved being called a product set, and (f) means for displaying the product set to the user, including for each item in the product set, the seller and the price of the item.

2. The apparatus of claim 1, further comprising means for accepting, from the user, an order for at least one of the members of the displayed product set.

3. The apparatus of claim 1, further comprising means for displaying a set of characteristics of a selected product, said set of characteristics being more detailed than what is displayed by the means for displaying the product set.

4. The apparatus of claim 3, further comprising means for accepting, from the user, an order for at least one of the members of the product set.

5. The apparatus of claim 4, wherein the database contains information on shipping charges for various weights and distances, and wherein the apparatus further comprises means for calculating the shipping charge and displaying said shipping charge to the user.

6. Apparatus for assisting a user in locating and purchasing equipment, comprising:

(a) means for accepting, from the user, an indication of the type of equipment which the user desires to purchase, (b) means for displaying to the user, a template of specifications, said template of specifications being related to the type of equipment indicated in step (a), (c) means for accepting, from the user, a choice of at least one of said specifications, (d) means for searching a database to locate all items of equipment belonging to the type indicated by the user and having the chosen specifications, the searching step including the step of retrieving items belonging to the type indicated by the user and having the chosen specifications, the items retrieved by said means for searching being called a product set, and (e) means for displaying, to the user, information about each member of the product set.

7. Apparatus of claim 6, further comprising means for selecting a member of the product set, means for determining all suppliers which sell the selected member, and means for displaying information about each supplier of the selected member, the supplier information including price information.

8. The apparatus of claim 7, further comprising means for displaying a set of characteristics of the selected member of the product set, said set of characteristics being more detailed than those displayed by said means for displaying information about each member of the product set.

9. The apparatus of claim 8, further comprising means for accepting, from the user, an order for at least one displayed member of the product set.

10. The apparatus of claim 9, wheein the database contains information on shipping charges for various weights and distances, and wherein the apparatus further comprises means for calculating the shipping charge and displaying said shipping charge to the user.

11. The apparatus of claim 7, further comprising means for accepting, from the user, an order for at least one displayed member the product set.

12. The apparatus of claim 11, wherein the database contains information on shipping charges for various weights and distances, and wherein the apparatus further comprises means for calculating the shipping charge and displaying said shipping charge to the user.

* * * * *